US011475164B2

(12) United States Patent
Di Pietro et al.

(10) Patent No.: US 11,475,164 B2
(45) Date of Patent: *Oct. 18, 2022

(54) COMPUTING SYSTEM PROVIDING METADATA MODIFICATION POLICY ENFORCEMENT AND RELATED METHODS

(71) Applicant: CITRIX SYSTEMS, INC., Fort Lauderdale, FL (US)

(72) Inventors: Marcos Alejandro Di Pietro, Hallandale Beach, FL (US); Thierry Duchastel, Cooper City, FL (US); Anjaneya Padmakar Akondi, Coral Springs, FL (US); Philip Wiebe, Davie, FL (US); Raja Mummidi, Pompano Beach, FL (US); Jacob Maynard, Hollywood, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/238,410

(22) Filed: Apr. 23, 2021

(65) Prior Publication Data

US 2021/0303730 A1 Sep. 30, 2021

Related U.S. Application Data

(63) Continuation of application No. 16/117,138, filed on Aug. 30, 2018, now Pat. No. 10,990,699.

(51) Int. Cl.
*G06F 21/62* (2013.01)
*H04W 12/02* (2009.01)
(Continued)

(52) U.S. Cl.
CPC ........ *G06F 21/6254* (2013.01); *H04L 67/125* (2013.01); *H04W 12/02* (2013.01); *H04W 12/37* (2021.01); *H04L 63/20* (2013.01)

(58) Field of Classification Search
CPC ... G06F 21/6254; H04L 67/125; H04L 63/20; H04W 12/02; H04W 12/37
See application file for complete search history.

(56) References Cited

U.S. PATENT DOCUMENTS 9,176,744 B2 11/2015 Lee
9,538,345 B2 1/2017 Sah et al.
(Continued)

FOREIGN PATENT DOCUMENTS

WO WO2009035544 3/2009

*Primary Examiner* — Vu V Tran
(74) *Attorney, Agent, or Firm* — Allen, Dyer, Doppelt + Gilchrist, PA

(57) ABSTRACT

A computing device may include a memory and a processor cooperating with the memory to enroll with a server having a metadata anonymization policy associated therewith, generate metadata and combine the metadata with respective user content data, where the computing device has a given metadata permission policy associated therewith from among a plurality of different metadata permission policies. The processor may further determine user content data having metadata combined therewith in violation of the metadata anonymization policy, and when the given metadata permission policy permits modification of metadata, modify the metadata in violation of the metadata anonymization policy so that only the modified metadata is accessible when the user content data is accessed.

20 Claims, 9 Drawing Sheets

(51) Int. Cl.
*H04L 67/125* (2022.01)
*H04W 12/37* (2021.01)
*H04L 9/40* (2022.01)

(56) References Cited

U.S. PATENT DOCUMENTS

| | | |
|---|---|---|
| 2011/0292231 A1 | 12/2011 | Winters |
| 2013/0088616 A1 | 4/2013 | Ingrassia, Jr. |
| 2013/0191922 A1* | 7/2013 | Rigas .................. H04W 12/02 |
| | | 726/26 |
| 2014/0295821 A1 | 10/2014 | Qureshi |
| 2015/0186674 A1* | 7/2015 | Vyas .................... H04W 12/02 |
| | | 726/26 |
| 2016/0034717 A1* | 2/2016 | Keohane ............. G06F 21/6254 |
| | | 726/1 |
| 2016/0283743 A1* | 9/2016 | Rueger ............... G06F 21/6254 |
| 2016/0314299 A1 | 10/2016 | Almer |
| 2018/0205762 A1* | 7/2018 | Panchbudhe .......... G06F 21/62 |
| 2019/0347344 A1* | 11/2019 | Kessler ............... G06F 11/3055 |

\* cited by examiner

COMPUTING SYSTEM PROVIDING METADATA MODIFICATION POLICY ENFORCEMENT AND RELATED METHODS

RELATED APPLICATIONS

This application is a continuation of U.S. application Ser. No. 16/117,138 filed Aug. 30, 2018, which is hereby incorporated herein in its entirety by reference.

BACKGROUND

Traditionally, personal computers include combinations of operating systems, applications, and user settings, which are each managed individually by owners or administrators on an ongoing basis. However, many organizations are now using application and/or desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual desktops and allow users to interconnect to them. For example, a VDI server(s) may include one or more hypervisors (virtual machine managers) to create and maintain multiple virtual machines, software to manage the hypervisor(s), a connection broker, and software to provision and manage the virtual desktops. In some embodiments, a VDI server(s) may provide access to shared server-based hosted applications, as well as Web/Software-as-a-Service (SaaS) applications.

Desktop virtualization systems may be implemented using a single virtualization server or a combination of servers interconnected as a server grid. For example, a cloud computing environment, or cloud system, may include a pool of computing resources (e.g., desktop virtualization servers), storage disks, networking hardware, and other physical resources that may be used to provision virtual desktops, or provide access to shared applications, along with additional computing devices to provide management and customer portals for the cloud system. In some implementations, virtual desktops and/or virtual applications may be incorporated as part of an overall unified endpoint management (UEM) and/or enterprise mobility management (EMM) strategy for securing enterprise data, for example.

SUMMARY

A computing device may include a memory and a processor cooperating with the memory to enroll with a server having a metadata anonymization policy associated therewith, and generate metadata and combine the metadata with respective user content data, where the computing device has a given metadata permission policy associated therewith from among a plurality of different metadata permission policies. The processor may further determine user content data having metadata combined therewith in violation of the metadata anonymization policy, and when the given metadata permission policy permits modification of metadata, modify the metadata in violation of the metadata anonymization policy so that only the modified metadata is accessible when the user content data is accessed.

In an example embodiment, the user content data may comprise image data and the metadata may comprise geolocation metadata. In accordance with another example, the user content data may comprise image data and the metadata may comprise timestamp metadata. In still another example implementation, the metadata may comprise geolocation data, and the geolocation metadata may be modified to change a location associated therewith to a bogus location. By way of example, in some embodiments the metadata may comprise user identification metadata, and the user identification metadata may be modified to change a user identity associated therewith to an anonymous identity.

The processor may further be configured to, when the given metadata permission policy does not permit modification of the metadata, block generation of the user content data, for example. Also by way of example, the metadata may comprise at least one of a call history, contact information, and a browsing history. In addition, the processor may be further configured to cooperate with the server to access a plurality of shared applications.

A related method may include enrolling a computing device with a server having a metadata anonymization policy associated therewith, and generating metadata and combining the metadata with respective user content data at the computing device, with the computing device having a given metadata permission policy associated therewith from among a plurality of different metadata permission policies. The method may further include determining user content data having metadata combined therewith in violation of the metadata anonymization policy at the computing device, and when the given metadata permission policy permits modification of metadata, modifying the metadata in violation of the metadata anonymization policy at the computing device so that only the modified metadata is accessible when the user content data is accessed.

A related non-transitory computer-readable medium may have computer executable instructions for causing a computing device to performs steps including enrolling with a server having a metadata anonymization policy associated therewith, and generating metadata and combining the metadata with respective user content data, with the computing device having a given metadata permission policy associated therewith from among a plurality of different metadata permission policies. The steps may further include determining user content data having metadata combined therewith in violation of the metadata anonymization policy and, when the given metadata permission policy permits modification of metadata, modifying the metadata in violation of the metadata anonymization policy so that only the modified metadata is accessible when the user content data is accessed.

DETAILED DESCRIPTION

The present description is made with reference to the accompanying drawings, in which example embodiments are shown. However, many different embodiments may be used, and thus the description should not be construed as limited to the particular embodiments set forth herein. Like numbers refer to like elements throughout.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
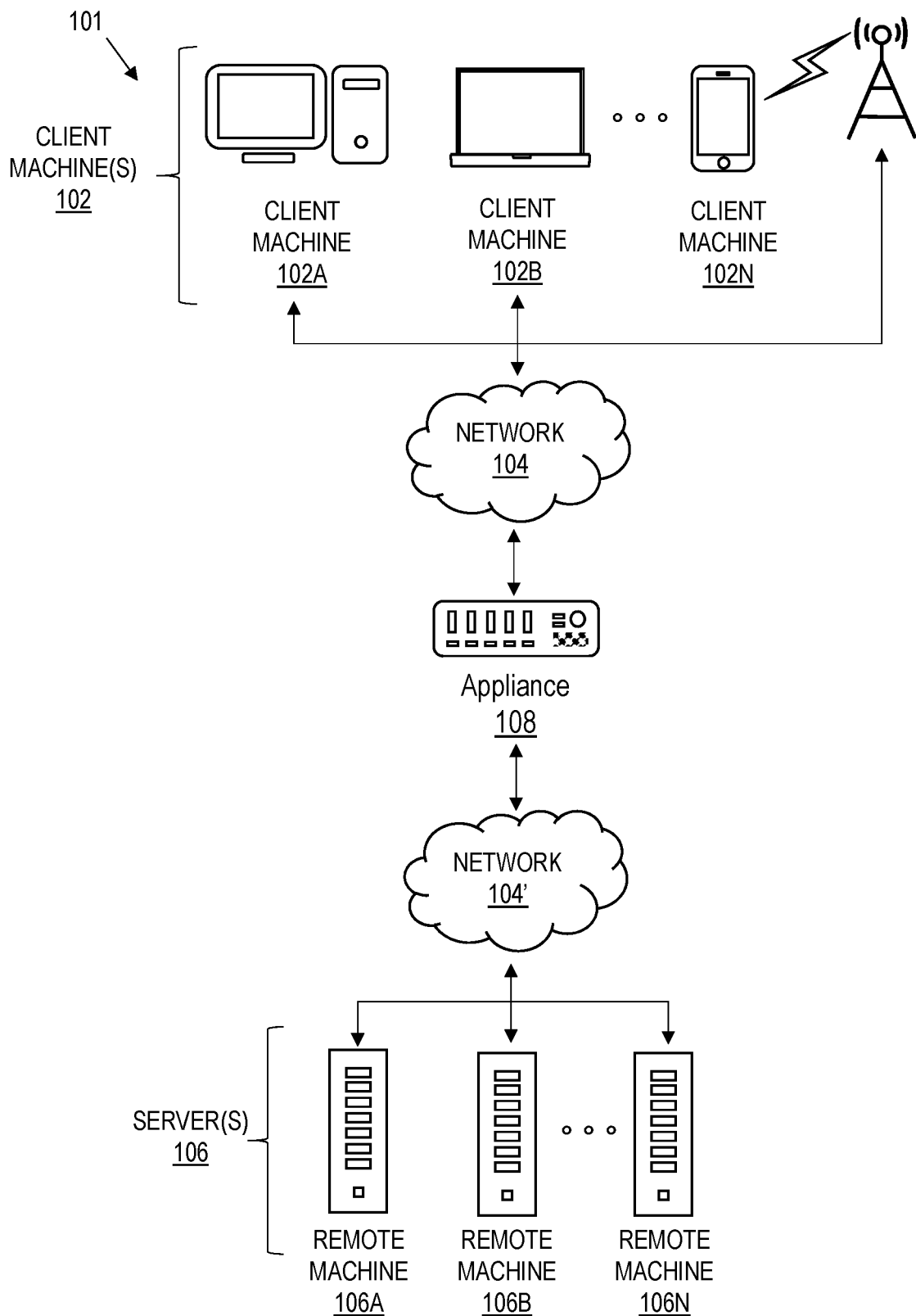
FIG. 1 is a schematic block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
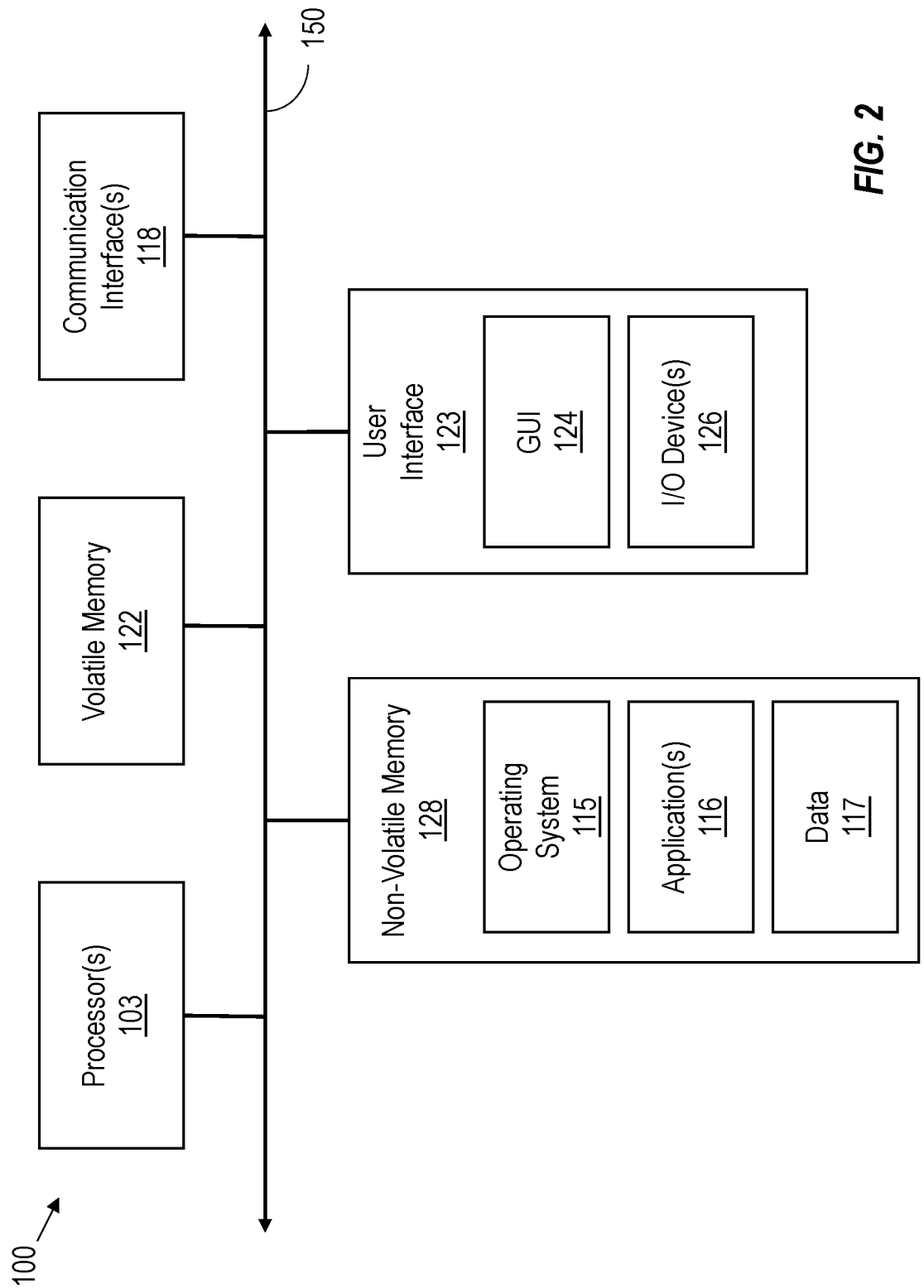
FIG. 2 is a schematic block diagram of a computing device useful for practicing an embodiment of the client machines or the remote machines illustrated in FIG. 1.

FIG. 2 depicts a block diagram of a computing device 100 useful for practicing an embodiment of client devices 102, appliances 108 and/or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 103 may be analog, digital or mixed-signal. In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
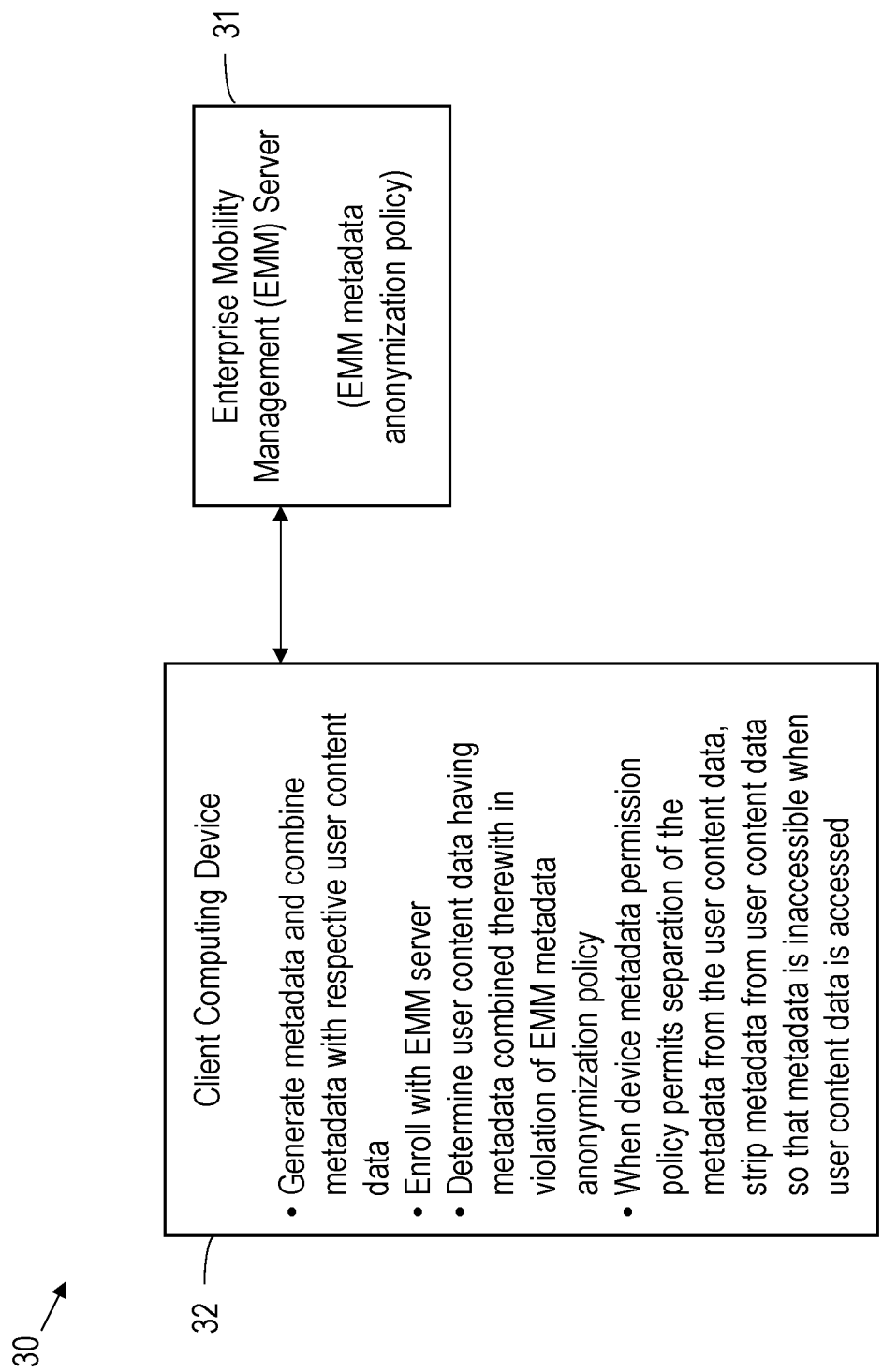
FIG. 3 is a schematic block diagram of a computing system providing enterprise mobility management (EMM) metadata anonymity policy enforcement in accordance with an example embodiment.
Figure 7:
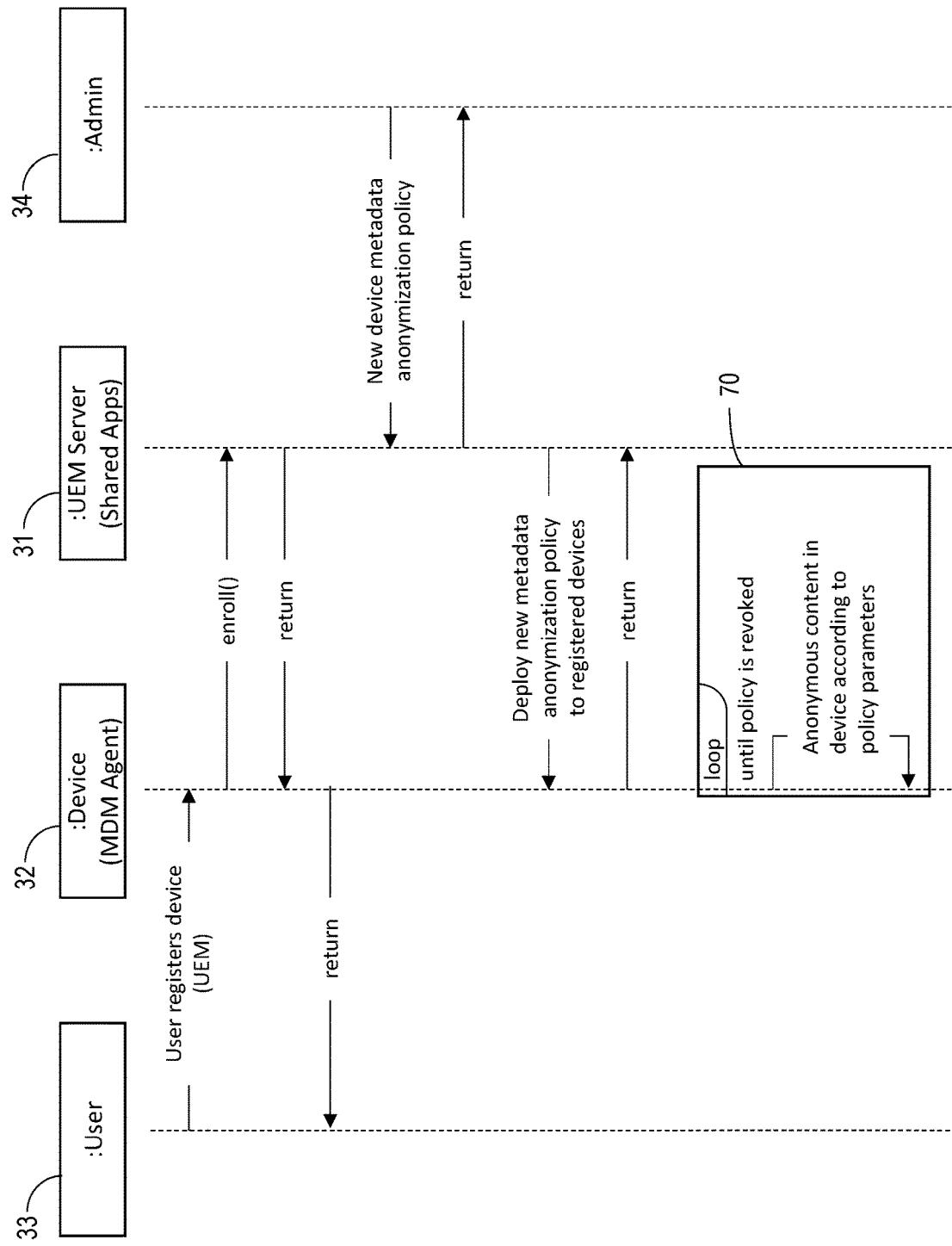
FIG. 7 is a system flow diagram illustrating an example implementation of the system of FIG. 3 and an associated sequence of operations associated therewith.
Figure 8A:
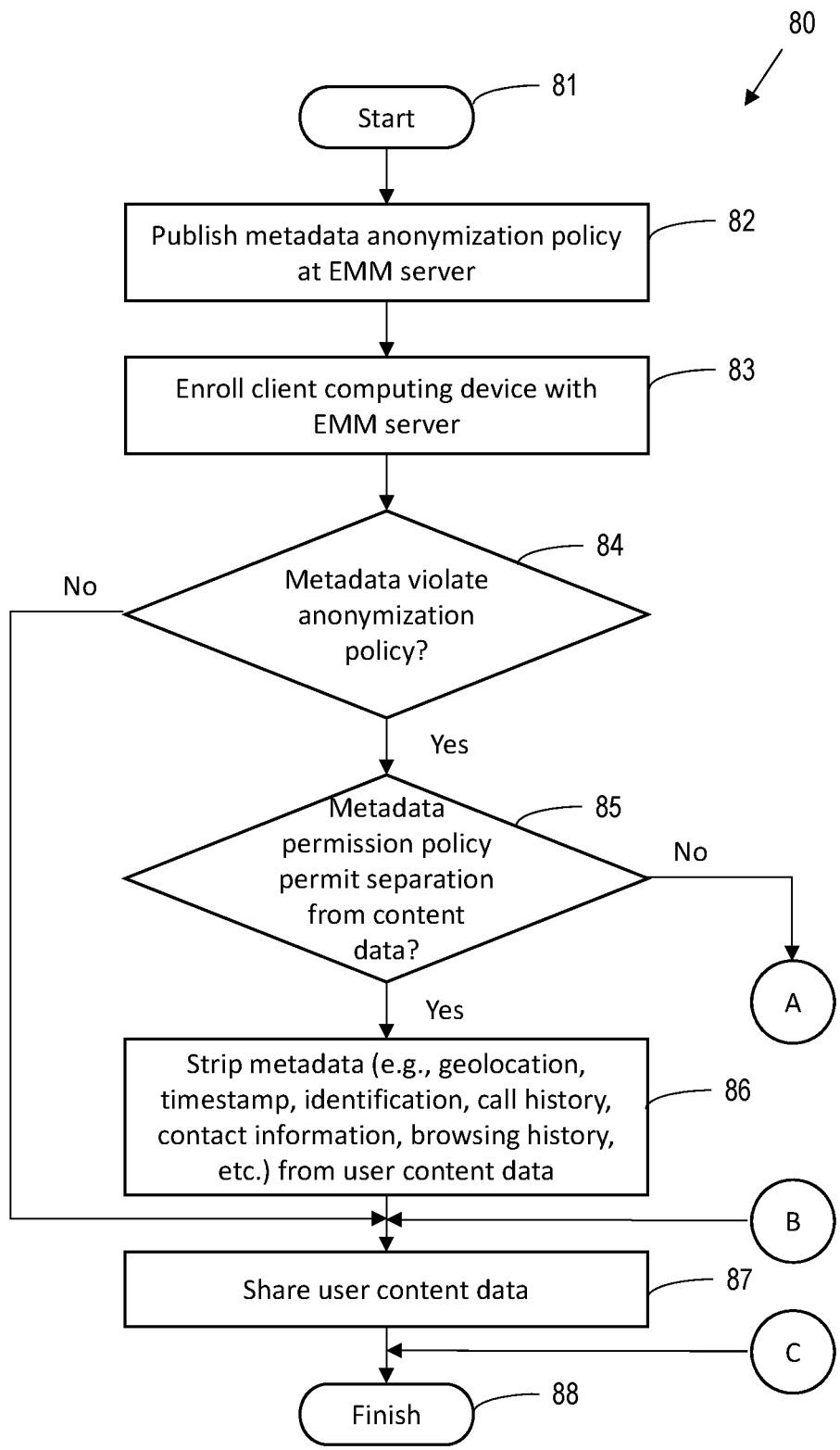
FIGS. 8A and 8B are a flow diagram illustrating method aspects associated with the system of FIG. 3.
Figure 8B:
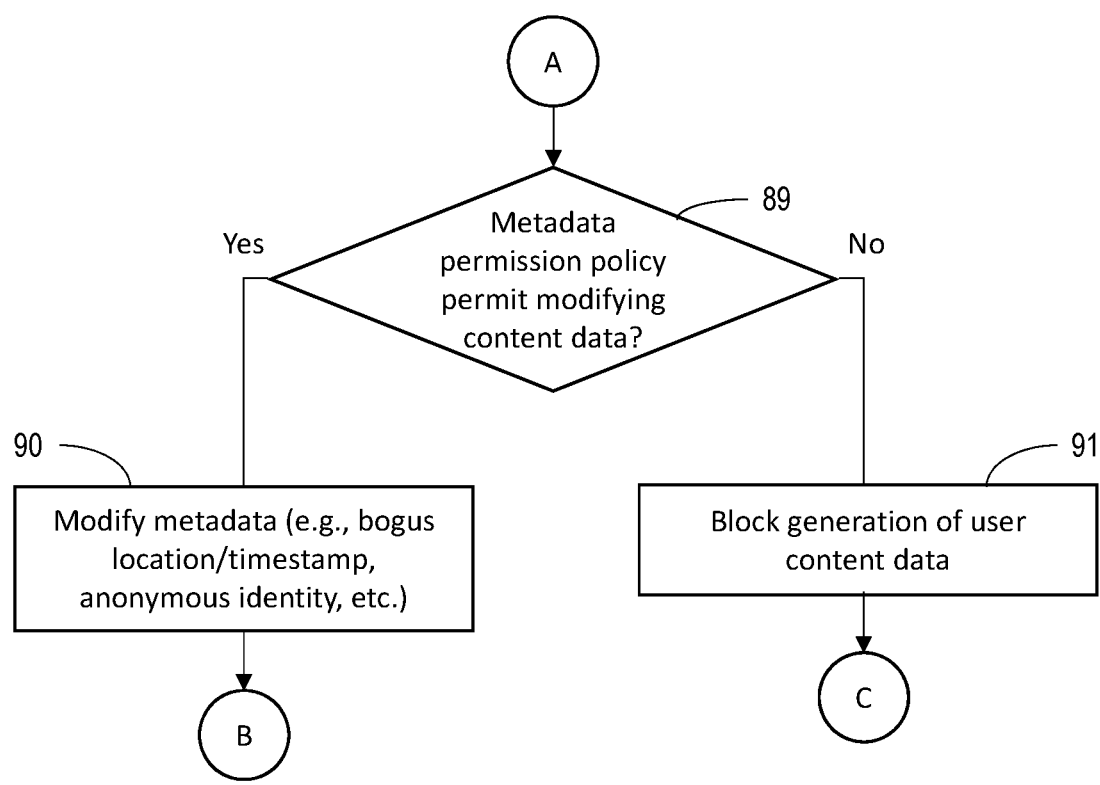

Turning now to FIG. 3, the flow diagram 70 of FIG. 7, and flow diagram 80 of FIGS. 8A-8B, a computing system 30 and associated method aspects are first described. By way of background, electronic devices such as smartphones, tables, computers, laptops and the like allow users to generate content such as photos, videos, documents, etc. In most modern devices, such content includes metadata about the user and other related contextual information of which the user may not be aware, and typically has not consented to.

For example, when taking a photo, most modern electronic devices save a file (typically a JPEG) to the device's storage (e.g., a FLASH memory) in accordance with an Exchangeable Image File Format (EXIF). In addition to the actual picture content data, the device also records supplemental metadata as well along with the image. More particularly, this may include date and/or time (timestamp), camera settings, geolocation information, author (which may default to a device identifier), etc. This information, which the user is often not aware of, may be used for malicious purposes by a bad actor. For example, a hacker or a spying entity can learn from an image the location a user was at on a given date. In another example, when editing a document, information about the device being used to change the document (and therefore the user) might be added to the metadata as well as the date in which the document has been last accessed or modified by the user.

Generally speaking, enterprise access/security systems, such as enterprise mobility management (EMM) or unified endpoint management (UEM) systems, may provide a Mobile Application Management (MAM) or Mobile Device Management (MDM) platform for providing access to shared applications such as hosted/managed, Web, and SaaS applications. EMM systems may include a combination of MDM and MAM solutions along with a secure container to keep enterprise data secure. Such EMM systems may utilize a unified endpoint management (UEM) approach to securing client endpoints such as laptops, smartphones, tablets, desktop computers, printers and wearables from a single source. Unified endpoint approaches currently do not provide a method for administrators to create policies that will protect their users and devices from unwanted metadata information disclosure. The system 30 advantageously provides an approach, such as for use with a unified endpoint management policy, that may help protect the user's anonymity or sensitive information that may otherwise be compromised through metadata.

The computing system 30 illustratively includes a server 31, which in the example embodiment is an EMM server that provides security through a unified endpoint management policy. More particularly, this may include a metadata anonymization policy. The system 30 further illustratively includes a client computing device 32 configured to generate metadata and combine the metadata with respective user content data. As noted above, various types of client computing devices 32 may be used, such as smartphones, tablet computers, laptop computers, desktop computers, etc. Moreover, while only a single client computing device 32 is shown in the illustrated example for clarity of illustration, it will be appreciated that many such client computing devices may be used in the system 30. As also discussed above, the client computing device 32 may create user content data such as documents, images, etc., for which various metadata is generated and associated with or attached to (e.g., in accordance with EXIF for images). Other types of metadata may include call history information, contact information, browsing history information, etc.

Different client device platforms (e.g., iOS, Android, Windows, etc.) and associated applications will have different settings with respect to the creations and usage of metadata. Moreover, there will be a metadata permission policy (or policies) in place on each client computing device that will dictate whether metadata can be parsed or separated from its respective content data (e.g., a particular file format may require that specific metadata always be appended). Moreover, the metadata permission policy or rules may also dictate whether such metadata can be modified in the event that it is required for the given file type.

Beginning at Block 81, a user 33 initiates registration or enrollment of the client computing device 32 with the EMM server 31, which has a published metadata anonymity policy associated therewith (e.g., as part of the unified endpoint management security protocols), at Blocks 82-83. In the example of FIG. 7, the client computing device 32 has an MDM agent installed thereon which operates to enforce the UEM policies of the EMM server 31, as well as allowing access to shared applications, as noted above. However, in other embodiments (e.g., MAM), an agent need not be installed on the client computing device 32, although some of the options described below for modifying or blocking metadata may require the use of a client agent depending upon the given client device platform. In accordance with one example implementation, the EMM/UEM server 31 may be implemented using the Citrix XenMobile platform, and the client-side platform or agent used to interface with the server and enforce the metadata policy may be Citrix Secure Hub, for example, although other software or platforms may be used in different embodiments.

Once the EMM metadata anonymization policy has been deployed to the client computing device 32, it may then determine user content data (e.g., images, documents, etc.) having metadata combined or associated therewith that is in violation of the metadata anonymization policy, at Block 84. When the metadata permission policy or rules of the client computing device 32 permit separation of the metadata from the user content data (Block 85), the client computing device may then strip the metadata from the user content data so that the metadata is inaccessible when the user content data is accessed, at Block 86. In accordance with one example implementation, a UEM agent or software on the client computing device 32 may scan the device (or the content data for managed apps) for existing content which might have unwanted metadata and strips it away from the content. The UEM software may also detect newly created content on the client computing device 32 and strip unwanted metadata away from this content as well. In some instances, all of the metadata associated with the content data may be stripped, or in other embodiments just the metadata that is in violation of the EMM metadata anonymity policy may be removed.

Figure 4:
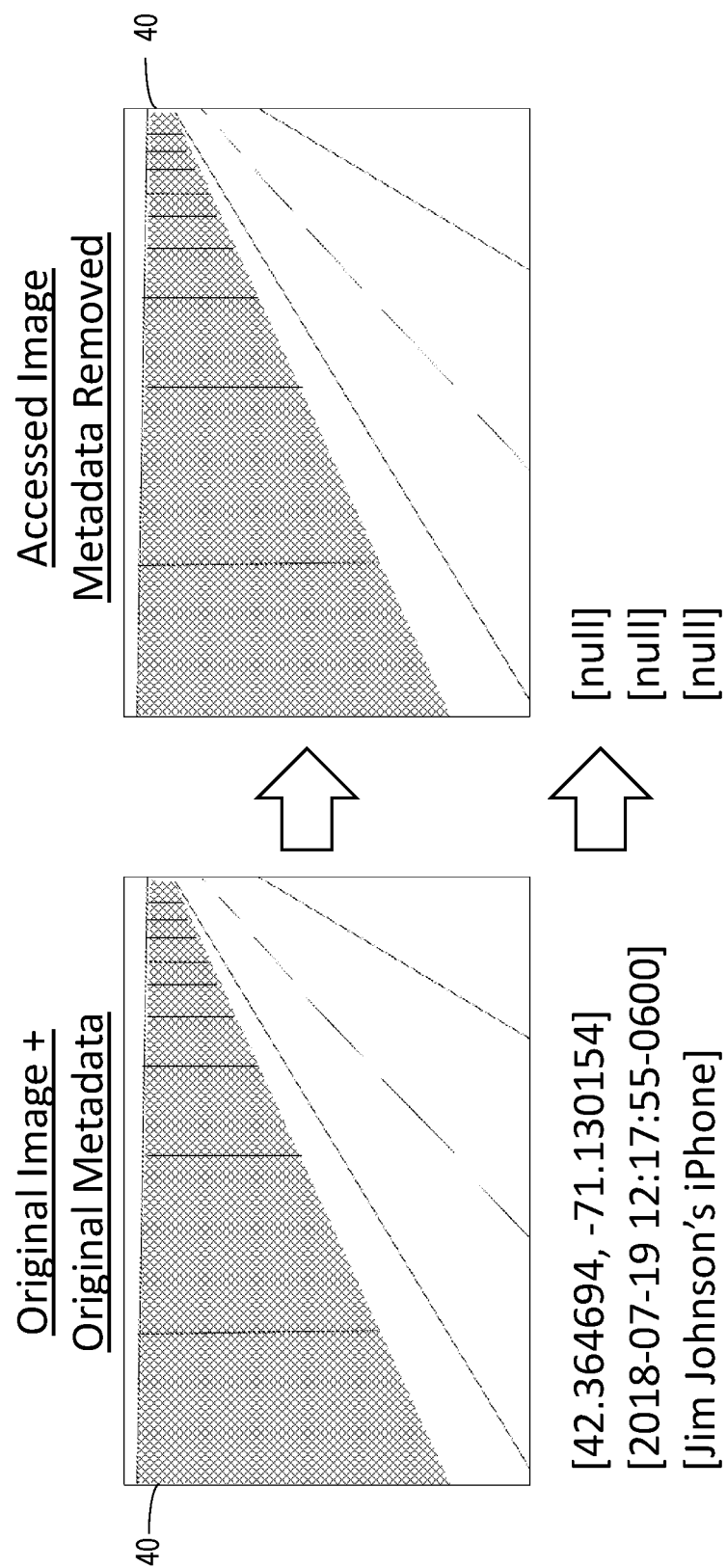
FIG. 4 is a diagram of image data and associated metadata before and after metadata removal by the system of FIG. 3.

An example use case is shown in FIG. 4, in which an image 40 of a roadway running along a fence line has certain metadata that was associated with the image at the time of its creation. More particularly, the metadata include geolocation data (here latitude/longitude coordinates 42.364694, −71.130154), a timestamp (2018-07-19 12:17:55-0600), and finally the "author" of the image, which in this case is automatically filled in as the name of the client computing device 32 that took the image ("Jim Johnson's iPhone"). In this example, all of this metadata would be in violation of the EMM metadata anonymity policy, as it would give information as to the user's location at a specific time, and also who the user is. Also in this example, the metadata permission policy or rules of the client computing device 32 (i.e., the device operating system and/or application(s) in question) allow this information to be separated or removed from the image data. Thus, when the image data is shared or otherwise accessed (e.g., attaching it to an email or text message, viewing in a photo viewer or editing program, etc.), at Block 87, the metadata fields for geolocation, time/date, and author will all be null or blank as shown.

Figure 5:
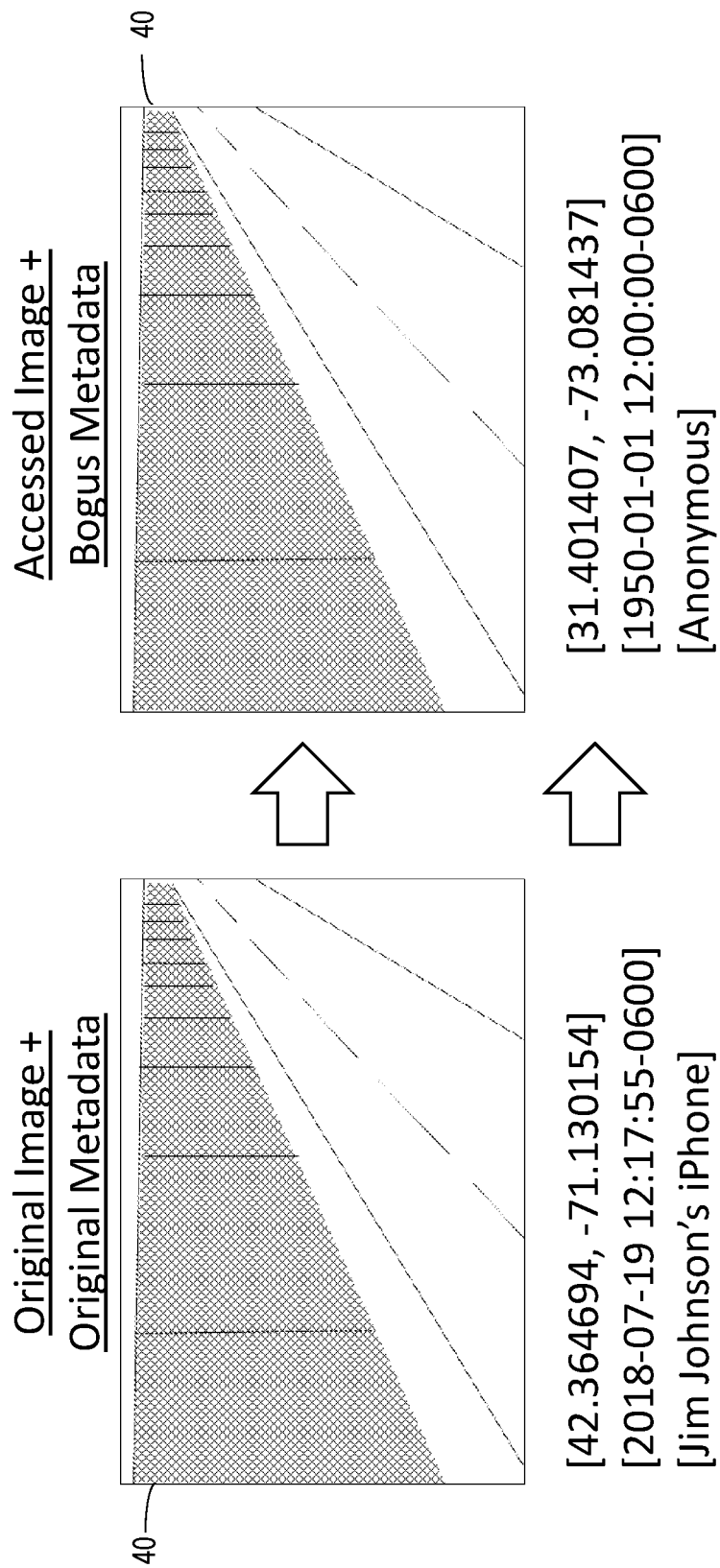
FIG. 5 is a diagram of image data and associated metadata before and after metadata modification by the system of FIG. 3.

In those implementations where the client computing device 32 metadata permission policy or rules do not permit separation of the metadata from the user content data (i.e., it is mandated that certain metadata fields accompany the given content data), if the policy permits modification of the metadata (Block 89), then the client computing device 32 may accordingly modify this metadata, at Block 90. As such, when the content data is accessed, only the modified metadata can be seen. With respect to UEM software running on the client computing device 32, when metadata cannot be stripped away from its respective content, the UEM software may invalidate the content by either anonymizing it or obfuscating it. Returning again to the example of the image 40 shown in FIG. 5, since the geolocation data cannot be removed from the image because the file format mandates that the geolocation is present, the UEM software instead changes the geolocation data to point to a bogus place (here latitude/longitude coordinates 31.401407, −73.081437 in the Atlantic Ocean). Similarly, the timestamp is set to a bogus date in the future or past (here 1950-01-01 12:00:00-0600), and the author data is also obfuscated (here "Anonymous"). These are merely examples, and different types of data may be modified in different ways to comply with the given EMM metadata anonymity policy.

Figure 6:
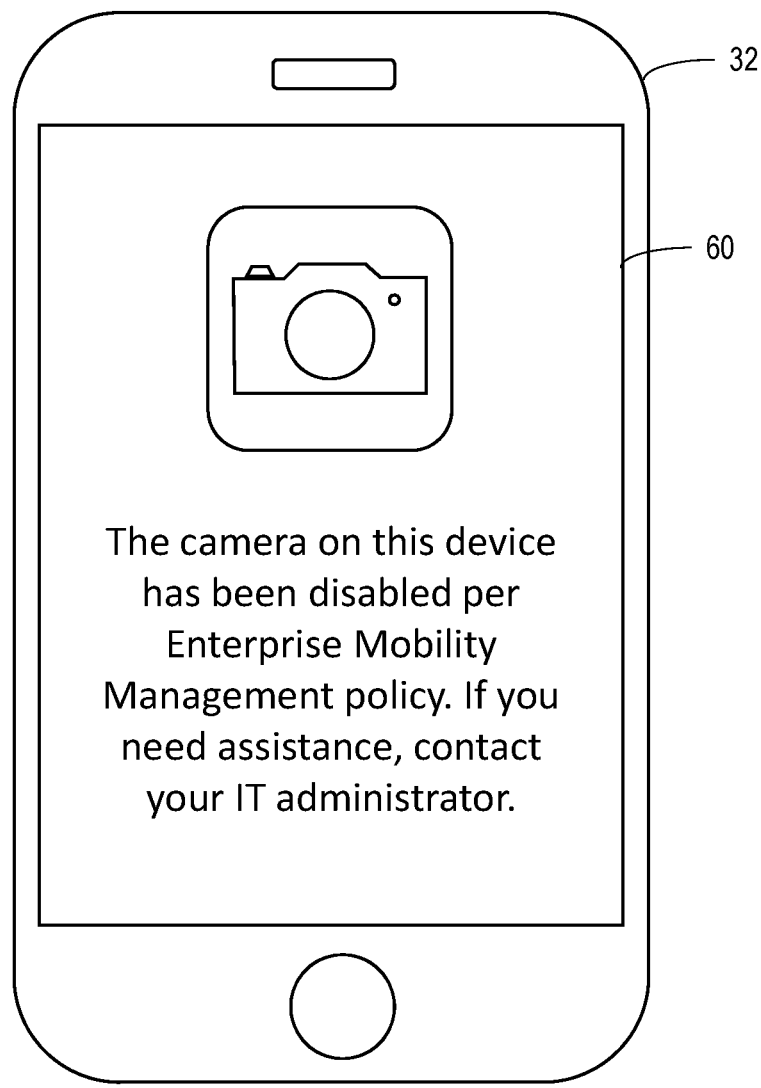
FIG. 6 is a front view of a mobile client computing device for use with the system of FIG. 3 in which camera functionality has been blocked in accordance with an EMM metadata anonymity policy.

In some instances, the client computing device 32 metadata permission policy may not permit removal or modification of the metadata, in which case the client computing device may accordingly block generation of the user content data altogether, at Block 91. In the example UEM implementation, if the client computing device 32 does not allow the UEM software or agent to arbitrarily modify the metadata of content being generated by the device, the UEM agent may accordingly enact device policies that prevent the user 33 from using device functionality that generates such content. For example, referring to FIG. 6 and continuing with the example of a digital image, if it is not possible for the UEM agent to change image or photo metadata because the device platform prevents such functionality from being implemented, the UEM agent may then configure the managed device client computing device 32 in such a way as to prevent the device from being used to take photos. In the illustrated example, a message is displayed on a display or screen 60 of the client computing device 32 when the user 33 attempts to use the device's digital camera. The message informs the user 33 that the camera on the device has been disabled pursuant to the EMM metadata policy, though other notifications (or none) may be provided in different embodiments. The method 80 illustratively concludes at Block 88.

The above-described approach advantageously helps to address a technical problem of unknowingly divulging computer-generated metadata by providing a device policy that can be used in a UEM or other EMM configuration to allow enterprises to publish metadata policies and control metadata dissemination and/or creation. As seen in FIG. 7, the metadata anonymization policy may advantageously be changed from time-to-time by the administrator 34, and such changes are deployed to enrolled client computing devices 32. Moreover, once the metadata anonymization policy is in effect, the client computing device 32 (e.g., the UEM agent at the client computing device) may continuously perform the above-described metadata monitoring and management functions until new policy changes are implemented, as indicated by the Block 70.

It should also be noted that, in some embodiments, the order of whether metadata is stripped or modified may be changed. That is, in some applications it may be desirable to first attempt to modify metadata (e.g., make it bogus) before stripping it, or only try to do one or the other. Moreover, in some embodiments it may be desirable to proceed directly to blocking a program from creating metadata without first attempting to strip or modify its data. Furthermore, different combinations of the above may be performed, such as to block usage of specific types of programs, while allowing others to operate yet taking a metadata removal and/or modification approach to those.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A computing device comprising:
a memory and a processor cooperating with the memory to
enroll with a server having a metadata anonymization policy associated therewith,
generate metadata and combine the metadata with respective user content data, the computing device having a given metadata permission policy associated therewith from among a plurality of different metadata permission policies,
determine a violation of the metadata anonymization policy by the metadata, and
when the given metadata permission policy permits modification of the metadata, modify the metadata in violation of the metadata anonymization policy so that only the modified metadata is accessible when the user content data is accessed.

2. The computing system of claim 1 wherein the user content data comprises image data and the metadata comprises geolocation metadata.

3. The computing system of claim 1 wherein the user content data comprises image data and the metadata comprises timestamp metadata.

4. The computing system of claim 1 wherein the metadata comprises geolocation data; and wherein the geolocation metadata is modified to change a location associated therewith to a bogus location.

5. The computing system of claim 1 wherein the metadata comprises user identification metadata; and wherein the user identification metadata is modified to change a user identity associated therewith to an anonymous identity.

6. The computing system of claim 1 wherein the processor is further configured to, when the given metadata permission policy does not permit modification of the metadata, block generation of the user content data.

7. The computing system of claim 1 wherein the metadata comprises at least one of a call history, contact information, and a browsing history.

8. The computing system of claim 1 wherein the processor is further configured to cooperate with the server to access a plurality of shared applications.

9. A method comprising:
enrolling a computing device with a server having a metadata anonymization policy associated therewith;
generating metadata and combining the metadata with respective user content data at the computing device, the computing device having a given metadata permission policy associated therewith from among a plurality of different metadata permission policies;
determining a violation of the metadata anonymization policy by the metadata at the computing device; and
when the given metadata permission policy permits modification of the metadata, modifying the metadata in violation of the metadata anonymization policy at the computing device so that only the modified metadata is accessible when the user content data is accessed.

10. The method of claim 9 wherein the user content data comprises image data and the metadata comprises geolocation metadata.

11. The method of claim 9 wherein the user content data comprises image data and the metadata comprises timestamp metadata.

12. The method of claim 9 wherein the metadata comprises geolocation data; and wherein the geolocation metadata is modified to change a location associated therewith to a bogus location.

13. The method of claim 9 wherein the metadata comprises user identification metadata; and wherein the user identification metadata is modified to change a user identity associated therewith to an anonymous identity.

14. The method of claim 9 further comprising, when the given metadata permission policy does not permit modification of the metadata, blocking generation of the user content data at the computing device.

15. A non-transitory computer-readable medium having computer executable instructions for causing a computing device to performs steps comprising:
enrolling with a server having a metadata anonymization policy associated therewith;
generating metadata and combining the metadata with respective user content data, the computing device having a given metadata permission policy associated therewith from among a plurality of different metadata permission policies;
determining a violation of the metadata anonymization policy by the metadata; and
when the given metadata permission policy permits modification of the metadata, modifying the metadata in violation of the metadata anonymization policy so that only the modified metadata is accessible when the user content data is accessed.

16. The non-transitory computer-readable medium of claim 15 wherein the user content data comprises image data and the metadata comprises geolocation metadata.

17. The non-transitory computer-readable medium of claim 15 wherein the user content data comprises image data and the metadata comprises timestamp metadata.

18. The non-transitory computer-readable medium of claim 15 wherein the metadata comprises geolocation data; and wherein the geolocation metadata is modified to change a location associated therewith to a bogus location.

19. The non-transitory computer-readable medium of claim 15 wherein the metadata comprises user identification metadata; and wherein the user identification metadata is modified to change a user identity associated therewith to an anonymous identity.

20. The non-transitory computer-readable medium of claim 15 further having computer-executable instructions for causing the computing device to perform a step of, when the given metadata permission policy does not permit modification of the metadata, blocking generation of the user content data at the computing device.

* * * * *